(12) United States Patent
Born et al.

(10) Patent No.: US 8,146,945 B2
(45) Date of Patent: Apr. 3, 2012

(54) MOTOR VEHICLE STEERING COLUMN

(75) Inventors: Christian Born, Hamburg (DE);
Karl-Heinz Knoll, Weinstadt (DE);
Karsten Mausolf, Soltau (DE);
Hermann Raabe, Filderstadt (DE);
Wolfgang Schuliers, Buchholz (DE)

(73) Assignee: Daimler AG, Stuttgart (DE)

( * ) Notice: Subject to any disclaimer, the term of this patent is extended or adjusted under 35 U.S.C. 154(b) by 1371 days.

(21) Appl. No.: 10/534,369

(22) PCT Filed: Sep. 19, 2003

(86) PCT No.: PCT/EP03/10458
§ 371 (c)(1),
(2), (4) Date: Jul. 3, 2007

(87) PCT Pub. No.: WO2004/041619
PCT Pub. Date: May 21, 2004

(65) Prior Publication Data
US 2011/0215560 A1 Sep. 8, 2011

(30) Foreign Application Priority Data
Nov. 7, 2002 (DE) .................................. 102 51 764

(51) Int. Cl.
*B62D 1/18* (2006.01)
(52) U.S. Cl. .......................................... 280/775; 74/493
(58) Field of Classification Search .................. 280/771, 280/775, 777; 74/492, 493
See application file for complete search history.

(56) References Cited

U.S. PATENT DOCUMENTS

| | | | |
|---|---|---|---|
| 4,752,085 A | | 6/1988 | Yamamoto |
| 5,048,364 A * | | 9/1991 | Minamoto et al. ............... 74/493 |
| 5,419,581 A | | 5/1995 | Schafer et al. |
| 6,079,743 A | | 6/2000 | Grams |
| 6,390,505 B1 * | | 5/2002 | Wilson .......................... 280/775 |
| 6,711,965 B2 * | | 3/2004 | Tomaru et al. .................. 74/493 |
| 6,902,191 B2 * | | 6/2005 | Angel ........................... 280/775 |
| 7,159,904 B2 * | | 1/2007 | Schafer et al. ................. 280/775 |
| 2002/0020245 A1 | | 2/2002 | Gaukel |

(Continued)

FOREIGN PATENT DOCUMENTS
DE 36 34 977 4/1987

(Continued)

OTHER PUBLICATIONS

Dictionary.com definition of Clamp, available at, http://dictionary.reference.com/browse/clamp?r=66 (last visited on Jul. 25, 2011)(clamp: "a device, usually of some rigid material, for strengthening or supporting objects or fastening them together.").*

(Continued)

*Primary Examiner* — Joseph Rocca
(74) *Attorney, Agent, or Firm* — Kenyon & Kenyon LLP

(57) ABSTRACT

A motor vehicle steering column includes a bracket fixed to the vehicle and a steering column tube. The steering column tube may be adjusted in inclination relative to the bracket fixed to the vehicle via an adjusting device. The adjusting device includes a lever which is mounted pivotably on the bracket and may be deflected about a pivot axis by a driving device. The motor vehicle steering column may permit a maximum inclination setting irrespective of the available construction space. A deflecting clamp which is connected pivotably to the steering column tube is coupled to an output end of the lever.

10 Claims, 3 Drawing Sheets

U.S. PATENT DOCUMENTS

| | | | |
|---|---|---|---|
| 2002/0024208 A1 | 2/2002 | Fujiu et al. | |
| 2002/0124677 A1* | 9/2002 | Tomaru et al. | 74/493 |
| 2004/0023746 A1* | 2/2004 | Arihara | 475/280 |
| 2004/0032121 A1* | 2/2004 | Schafer et al. | 280/775 |

FOREIGN PATENT DOCUMENTS

| | | |
|---|---|---|
| DE | 196 41 152 | 4/1988 |
| DE | 199 62 494 | 7/2000 |
| EP | 0 599 073 | 6/1994 |
| EP | 1 253 060 | 10/2002 |
| JP | 2000-344112 | 12/2000 |
| JP | 2001018809 A * | 1/2001 |

OTHER PUBLICATIONS

Merriam-Webster's Definition of "Lever," available at http://www.merriam-webster.com/dictionary/lever (last visited on Jul. 25, 2011)(lever: "a rigid piece that transmits and modifies force or motion when forces are applied at two points and it turns about a third; specifically : a rigid bar used to exert a pressure or sustain a weight at one point . . . ").*

* cited by examiner

MOTOR VEHICLE STEERING COLUMN

FIELD OF THE INVENTION

The present invention relates to a motor vehicle steering column with a bracket fixed to the vehicle and a steering column tube.

BACKGROUND INFORMATION

German Published Patent Application No. 196 41 152 describes a motor vehicle steering column, in which a steering column tube can be adjusted in inclination relative to a bracket fixed to the vehicle via an adjusting device. The adjusting device includes a lever which is mounted pivotably on the bracket and can be deflected about a pivot axis by a driving device—here an electric motor. The driving device drives a drive spindle on which a spindle nut is seated. The forward movement of the spindle nut causes the lever to be deflected on the bracket about a pivot axis, so that the steering column tube which is connected to the lever is carried along upward or downward.

This arrangement has the drawback that, for relatively large adjustments, the lever length has to be correspondingly enlarged. However, it is precisely in the cockpit region that the construction space available is not as desired.

SUMMARY

According to an example embodiment of the present invention, a motor vehicle steering column is provided which may permit a maximum inclination setting irrespective of the available construction space.

According to an example embodiment of the present invention, an adjusting device for the inclination setting of a steering column tube is provided, which device includes a lever which is mounted pivotably on a bracket fixed to the vehicle and to the output end of which is coupled a deflecting clamp. The deflecting clamp is connected pivotably to the steering column tube, so that, when the lever is deflected, the deflecting clamp and therefore the steering column tube are carried along. The transmission ratio between the lever and deflecting clamp is arranged such that a small deflection of the lever may cause a large adjustment of the deflecting clamp. Depending on the arrangement of the pivot axis of the lever and of the deflecting clamp, the adjustment of the steering column may be selected freely without having an increased need for construction space.

In an example embodiment, the steering column tube may be mounted on the bracket such it may be moved on a pivot axis extending transversely with respect to the longitudinal axis of the motor vehicle steering column. This pivot axis forms the pivot point of the motor vehicle steering column during the inclination setting. That is, the further away the pivot axis is arranged from the steering wheel, the greater the adjustments which may be achieved for the steering wheel by small adjustments of the adjusting device.

In addition to an inclination setting, the steering column tube may also be held such that it may be set in length. For this purpose, two steering column sections which may be displaced one inside the other are provided, with, below the longitudinal axis of the motor vehicle steering column, a flange being integrally formed on the outer steering column tube section. The integrally formed flange has a pivot axis of the deflecting clamp passing through it. The adjustment during the inclination setting may be determined as a function of the position of the pivot axis. The closer the pivot axis of the deflecting clamp is to the pivot axis of the lever, which axis is fixed on the vehicle, the greater the adjustments which are possible.

The deflecting clamp may have a substantially U-shaped configuration guided around the outer steering column tube section below. The free limb ends of the deflecting clamp may be coupled to the output end of the lever. This may improve the stiffness of the entire system.

The lever may have a substantially triangular longitudinal section form, so that the driving end is formed by a point of the triangle and the output end by another point of the triangle. The limb lengths of the triangular lever determine the lever ratios of the adjusting device.

The lever may be arranged mirror-symmetrically with respect to the longitudinal axis of the motor vehicle steering column, so that precise height setting without a lateral offset is possible.

Exemplary embodiments hereof are explained below with reference to the appended Figures.

DETAILED DESCRIPTION

Figure 1:
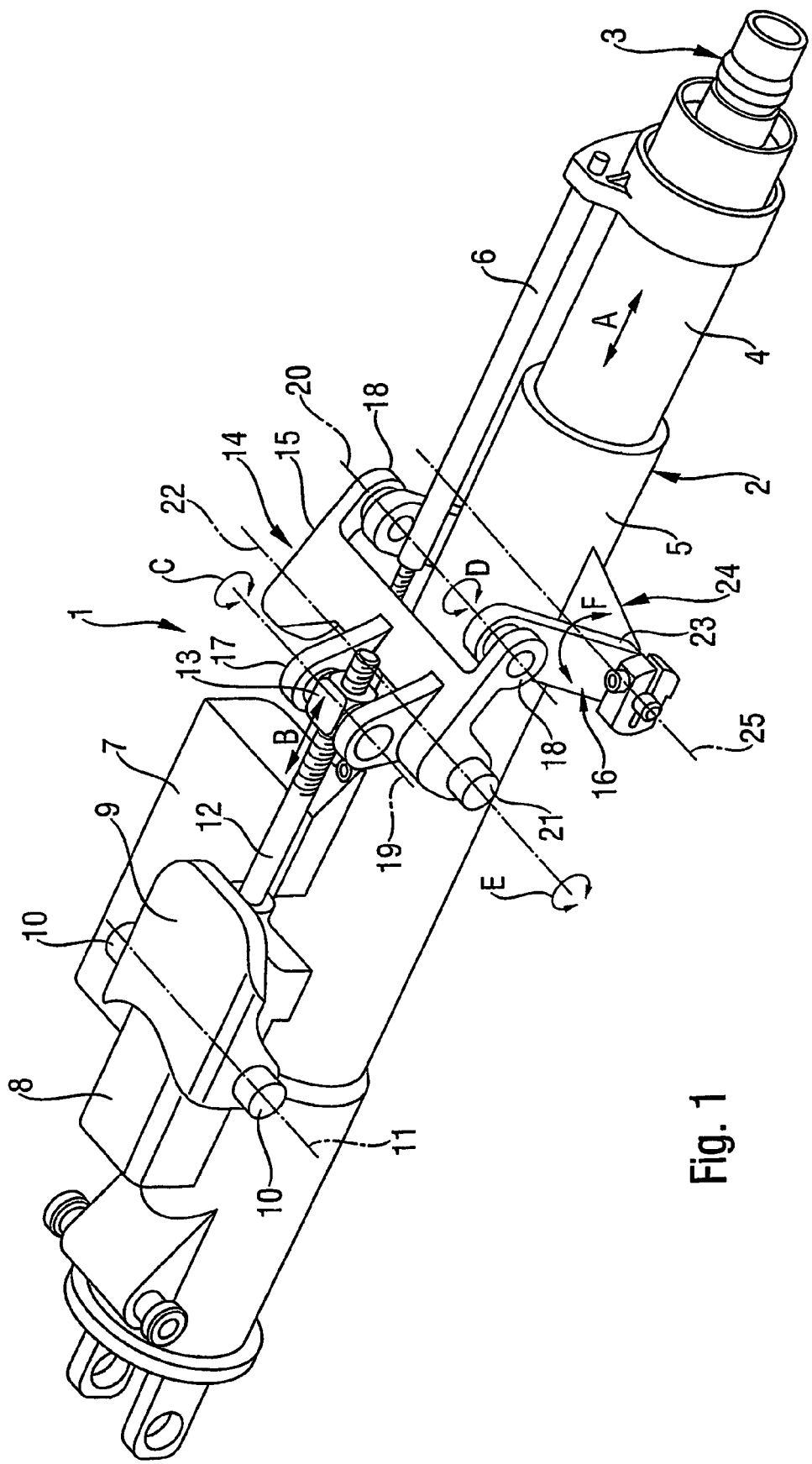
FIG. 1 is a perspective view of an example embodiment of a motor vehicle steering column.

FIG. 1 illustrates a motor vehicle steering column 1 with a two-part, telescopic steering column tube 2, in which a steering spindle 3 is rotatably mounted. The steering column tube 2 is connected to a bracket which is fixed to the vehicle.

The steering column tube 2 includes an inner steering column tube section 4 and an outer steering column tube section 5. The inner steering column tube section 4 is connected to a threaded spindle 6 which is driven by an electric motor 7. Depending on the direction of rotation of the threaded spindle 6, the inner steering column tube section 4 is moved into or out of the outer steering column tube section 5 in accordance with the arrow direction A, so that the motor vehicle steering column 1 is set comfortably in the longitudinal direction.

A second electric motor 8 is fastened to a mount 9 on the outer steering column tube section 5. The outside of the mount 9 has two axle stubs 10 which together form a pivot axis 11. The axle stubs 10 are mounted pivotably in receptacles of the bracket.

A second threaded spindle 12 is driven by the electric motor 8, so that—depending on the direction of rotation of the threaded spindle 12—a spindle nut 13 sitting on the threaded spindle 12 is moved to and fro in accordance with the arrow direction B.

The spindle nut 13 belongs to an adjusting device 14 via which the steering column tube 2 is held such that it may be adjusted in inclination relative to the bracket fixed to the vehicle.

The adjusting device 14 includes a lever 15 and a deflecting clamp 16. The lever 15 has a driving end 17 and an output end 18.

The driving end 17 is fastened pivotably to the spindle nut 13, so that the lever 15 may execute a pivoting movement in accordance with arrow direction C about a pivot axis 19. From the driving end 17, the lever 15 extends in an angular manner to the output end 18 to which the deflecting clamp 16 is coupled via a pivot axis 20, so that the deflecting clamp 16 may be moved about the pivot axis 20 in accordance with arrow direction D.

The lever 15 is provided with bearing journals 21 which are mounted in corresponding receptacles of the bracket and therefore form a pivot axis 22 about which the lever 15 may be pivoted in accordance with arrow direction E.

At its end 23 located opposite the pivot axis 20, the deflecting clamp 16 coupled to the output end 18 of the lever 15 is mounted pivotably on a flange 24 of the outer steering column tube section 5, so that a movement of the deflecting clamp 16 about a pivot axis 25 in accordance with arrow direction F is possible.

Figure 2:
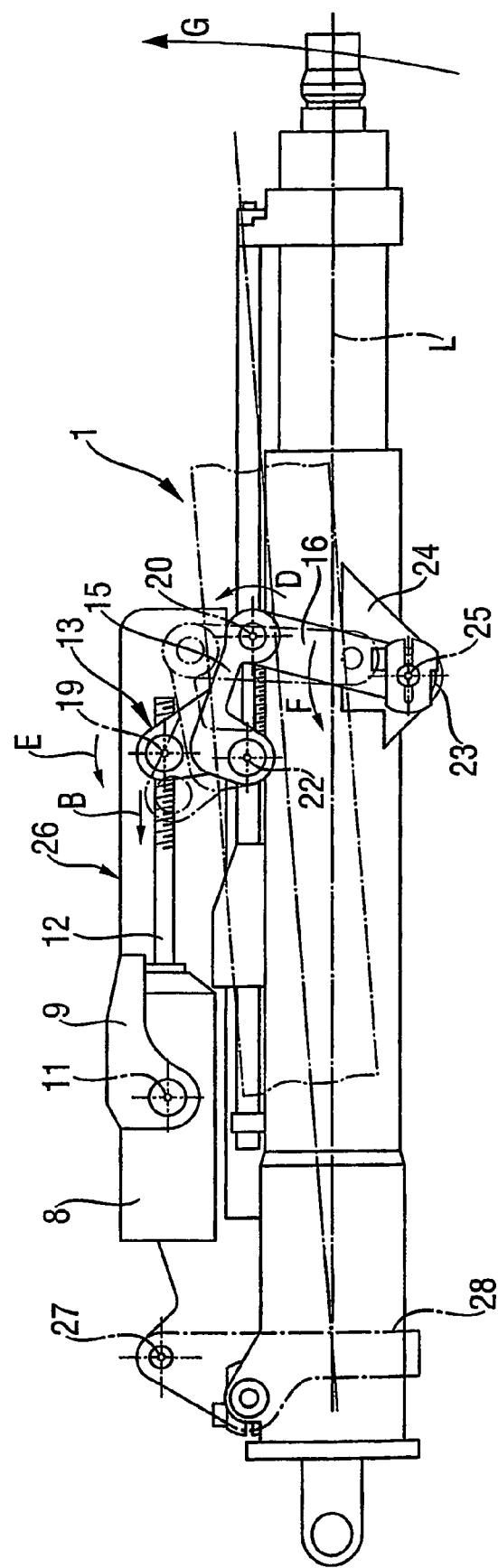
FIG. 2 is a side view of the motor vehicle steering column illustrated in FIG. 1.

FIG. 2 illustrates the motor vehicle steering column 1 (which is illustrated perspectively in FIG. 1) in a view from the side. In addition to the motor vehicle steering column 1, a bracket 26 which is fixed to the vehicle is indicated.

The motor vehicle steering column 1 is mounted on the bracket 26 via a clip 28 (illustrated schematically) such that the motor vehicle column 1 may move in a circular path in accordance with arrow direction G about a pivot axis 27 extending transversely with respect to the longitudinal axis L of the motor vehicle steering column 1. The movement of the motor vehicle steering column 1 along the arrow direction G is realized by the adjusting device 14 and offers the occupant the possibility of undertaking an inclination setting of the steering wheel.

The inclination adjustment by the adjusting device 14 takes place as follows:
starting from that position of the motor vehicle steering column 1 which is indicated in FIG. 2 by a solid line, the electric motor 8 is activated by the driver, so that the threaded spindle 12 rotates. As a result, the spindle nut 13 sitting on the threaded spindle 12 is moved in the arrow direction B into the position illustrated by chain-dotted lines and the lever 15 is therefore deflected about its pivot axis 22 in accordance with arrow direction E. During its movement, the output end 18 of the lever 15 carries along the deflecting clamp 16, with the result that the latter rotates about the pivot axis 25 in accordance with arrow direction F and, in the process, moves the motor vehicle steering column 1 upward in arrow direction G. This movement takes place on a circular path about the pivot axis 27 of the motor vehicle steering column 1.

During an opposed movement of the spindle nut 13, the movements of the adjusting device 14 are correspondingly reversed.

That movement of the spindle nut 13 which is on a circular path about the pivot axis 22 is compensated for by the pivotable mounting of the electric motor 8 or mount 9 permitting a pivoting movement of the threaded spindle 12 about the pivot axis 11. However, this compensation may also be achieved by a slotted-guide mechanism or a flexible threaded spindle.

Figure 3:
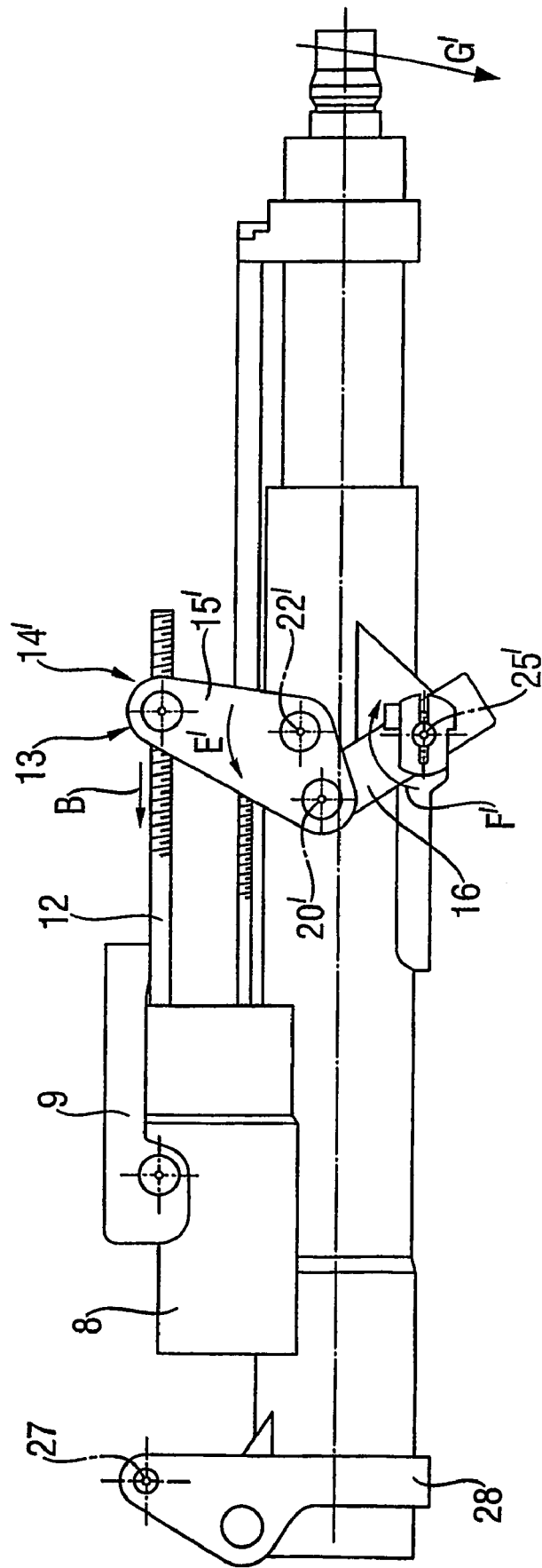
FIG. 3 is a side view of an example embodiment of a motor vehicle steering column.

FIG. 3 illustrates an example embodiment hereof, with the same reference numbers as in FIGS. 1 and 2 being used. Components which differ from the example embodiment illustrated in FIGS. 1 and 2 are indicated by an accompanying prime.

In the example embodiment illustrated in FIG. 3, the adjusting device 14' includes a lever 15', the pivot axis 22' of which, in contrast to the example embodiment illustrated in FIGS. 1 and 2, is shifted forward in the direction of the steering wheel. This may provide that, in the event of a crash, the forces introduced into the steering column cause a tensile stress in the threaded spindle 12.

The inclination setting by the adjusting device 14' takes place as follows:
The threaded spindle 12 is driven by the electric motor 8, so that the spindle nut 13 moves on the threaded spindle 12 in accordance with arrow direction B. The lever 15' is deflected about the pivot axis 22' in accordance with arrow E', as a result of which the pivot axis 20' is correspondingly shifted downward. The deflecting clamp 16 is pivoted about the pivot axis 25' in accordance with arrow direction F', so that the motor vehicle steering column 1 moves downward on a circular path about the pivot axis 27 in accordance with arrow direction G'.

In the case of a movement of the spindle nut 13 in the opposite direction, the sequence of movement of the adjusting device 14' takes place in the reverse direction.

In this example embodiment, the movement of the spindle nut 13 may be compensated for by the pivotable mounting of the electric motor 8 or the mount 9.

The invention claimed is:

1. A motor vehicle steering column, comprising:
    a bracket adapted to be fixed to a vehicle;
    an adjustment device including a lever mounted pivotably on the bracket, a driver device and a deflection clamp, the lever deflectable about a pivot axis by the driver device; and
    a steering column tube adjustable in inclination relative to the bracket by the adjustment device, the deflection clamp connected pivotably to the steering column tube and coupled to one output end of the lever;
    wherein the lever is deflectable about the pivot axis by reciprocating movement at one driving end of the lever;
    wherein the driver device is configured to compensate for the movement of the driving end of the lever;
    wherein the steering column tube includes two steering column tube sections, an outer steering column tube section including an integrally-formed flange below a longitudinal axis of the motor vehicle steering column, a pivot axis of the deflection clamp arranged on the flange.

2. The motor vehicle steering column according to claim 1, wherein the steering column tube is mounted on the bracket to move about a pivot axis that extends transversely with respect to a longitudinal axis of the motor vehicle steering column.

3. The motor vehicle steering column according to claim 1, wherein the lever has a substantially triangular longitudinal sectional form.

4. The motor vehicle steering column according to claim 1, wherein the lever is arranged mirror-symmetrically with respect to a longitudinal axis of the motor vehicle steering column.

5. A motor vehicle steering column, comprising:
    a bracket adapted to be fixed to a vehicle;
    an adjustment device including a lever mounted pivotably on the bracket, a driver device and a deflection clamp, the lever deflectable about a pivot axis by the driver device; and
    a steering column tube adjustable in inclination relative to the bracket by the adjustment device, the deflection clamp connected pivotably to the steering column tube and coupled to one output end of the lever;
    wherein the lever is deflectable about the pivot axis by reciprocating movement at one driving end of the lever;
    wherein the driver device is configured to compensate for the movement of the driving end of the lever;
    wherein the deflection clamp is U-shaped, a free limb end of the deflection clamp coupled to the output end of the lever.

6. The motor vehicle steering column according to claim 5, wherein the steering column tube is mounted on the bracket to move about a pivot axis that extends transversely with respect to a longitudinal axis of the motor vehicle steering column.

7. The motor vehicle steering column according to claim 5, wherein the lever has a substantially triangular longitudinal sectional form.

8. The motor vehicle steering column according to claim 5, wherein the lever is arranged mirror-symmetrically with respect to a longitudinal axis of the motor vehicle steering column.

9. A motor vehicle steering column, comprising:
  a bracket fixed to a vehicle;
  an adjustment device including a lever mounted pivotably on the bracket, a driver device and a deflection clamp, the lever deflectable about a pivot axis by the driver device; and
  a steering column tube adjustable in inclination relative to the bracket by the adjustment device, the deflection clamp connected pivotably to the steering column tube and coupled to one output end of the lever;
  wherein the lever is deflectable about the pivot axis by reciprocating movement at one driving end of the lever;
  wherein the driver device is configured to compensate for the movement of the driving end of the lever;
  wherein the steering column tube includes two steering column tube sections, an outer steering column tube section including an integrally-formed flange below a longitudinal axis of the motor vehicle steering column, a pivot axis of the deflection clamp arranged on the flange.

10. A motor vehicle steering column, comprising:
  a bracket fixed to a vehicle;
  an adjustment device including a lever mounted pivotably on the bracket, a driver device and a deflection clamp, the lever deflectable about a pivot axis by the driver device; and
  a steering column tube adjustable in inclination relative to the bracket by the adjustment device, the deflection clamp connected pivotably to the steering column tube and coupled to one output end of the lever;
  wherein the lever is deflectable about the pivot axis by reciprocating movement at one driving end of the lever;
  wherein the driver device is configured to compensate for the movement of the driving end of the lever;
  wherein the deflection clamp is U-shaped, a free limb end of the deflection clamp coupled to the output end of the lever.

* * * * *